Dec. 25, 1962    J. E. GUTRIDGE    3,070,041
HIGHWAY-RAILWAY TRANSPORTATION SYSTEM AND APPARATUS
Filed Nov. 29, 1957    13 Sheets-Sheet 1

INVENTOR
JACK E. GUTRIDGE
BY Mann Brown & McWilliams
ATTORNEYS

Dec. 25, 1962 J. E. GUTRIDGE 3,070,041
HIGHWAY-RAILWAY TRANSPORTATION SYSTEM AND APPARATUS
Filed Nov. 29, 1957 13 Sheets-Sheet 2

INVENTOR
JACK E. GUTRIDGE
BY Mann, Brown, McWilliams
ATTORNEY

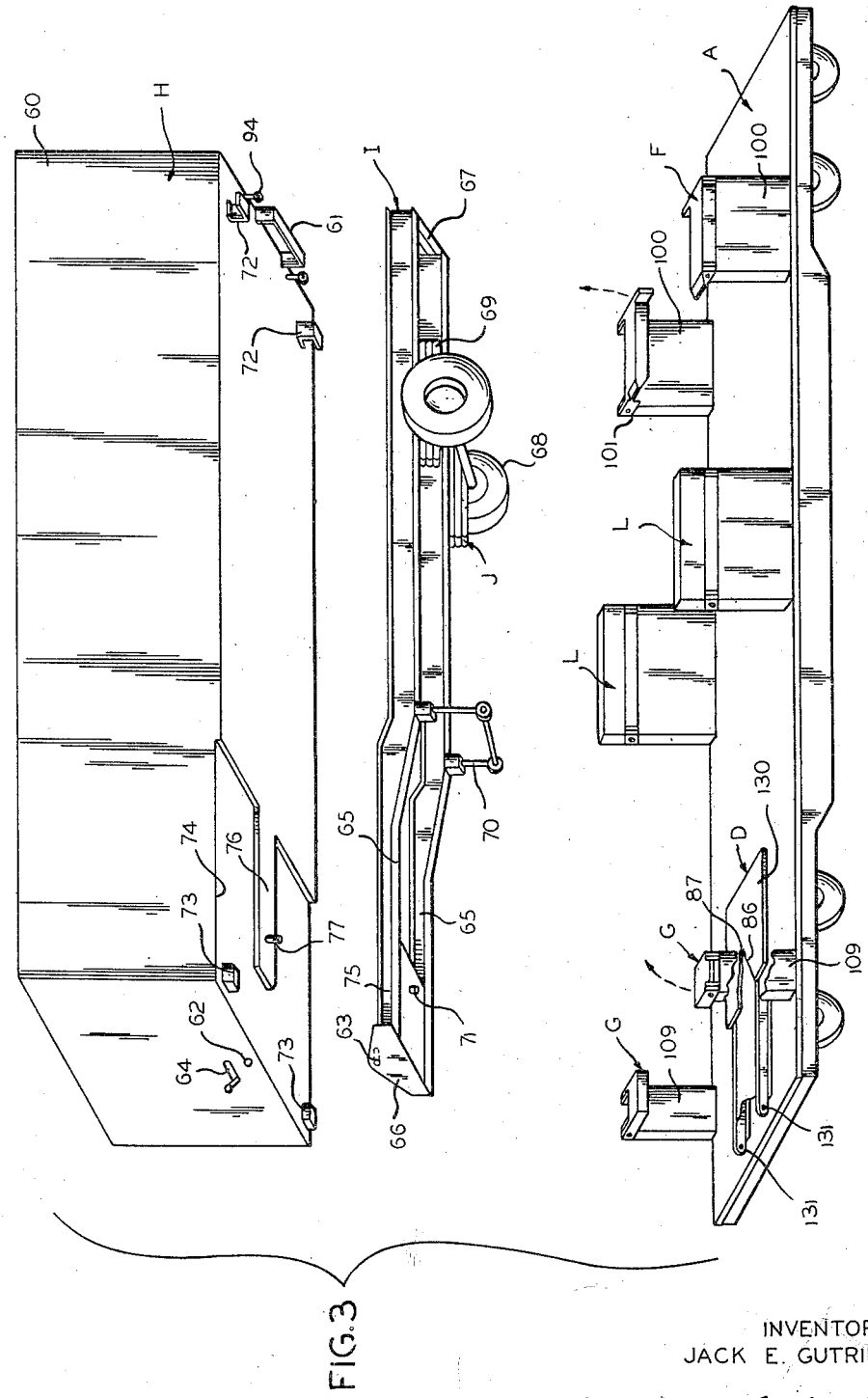

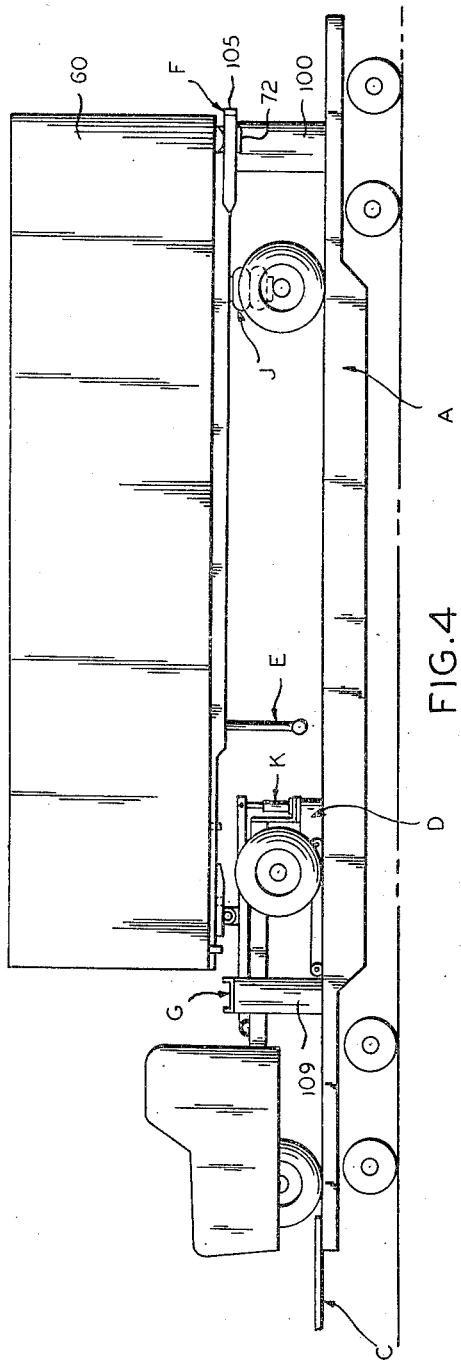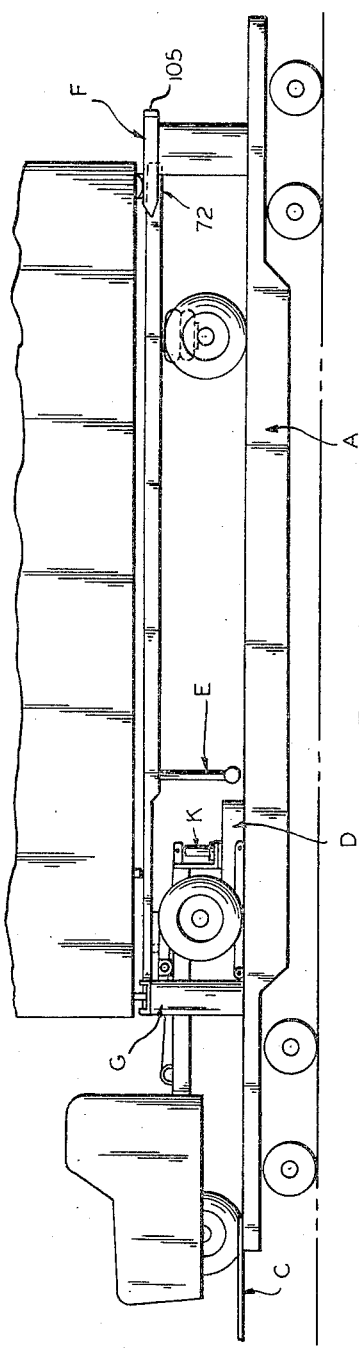

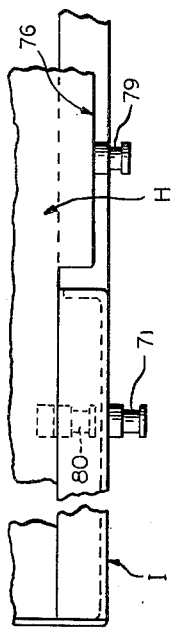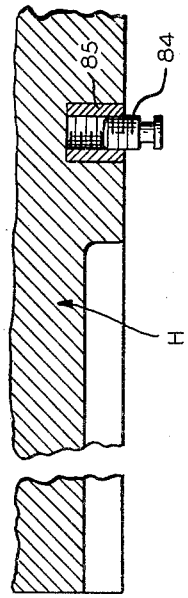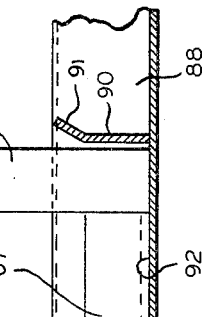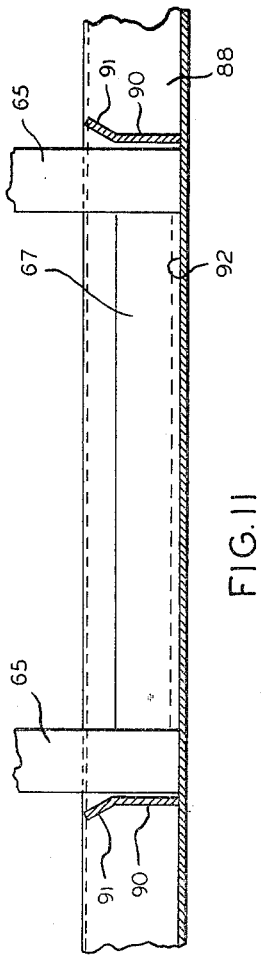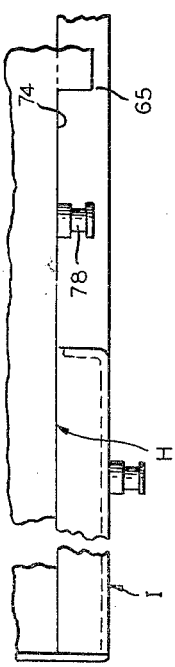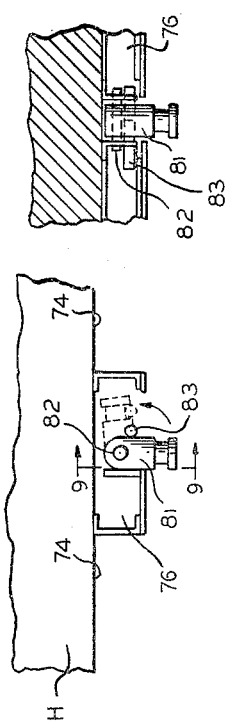

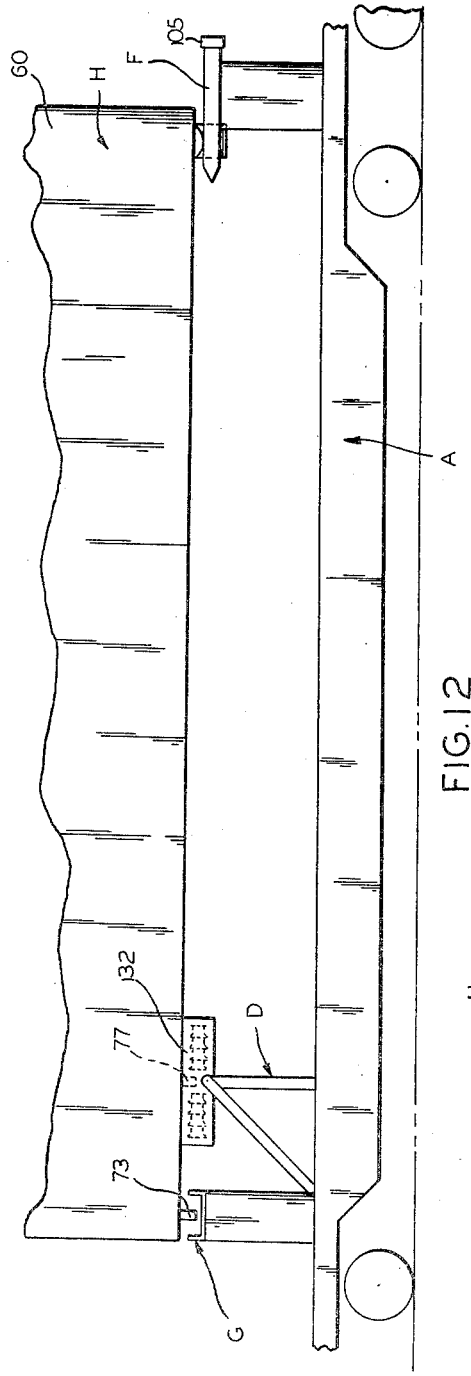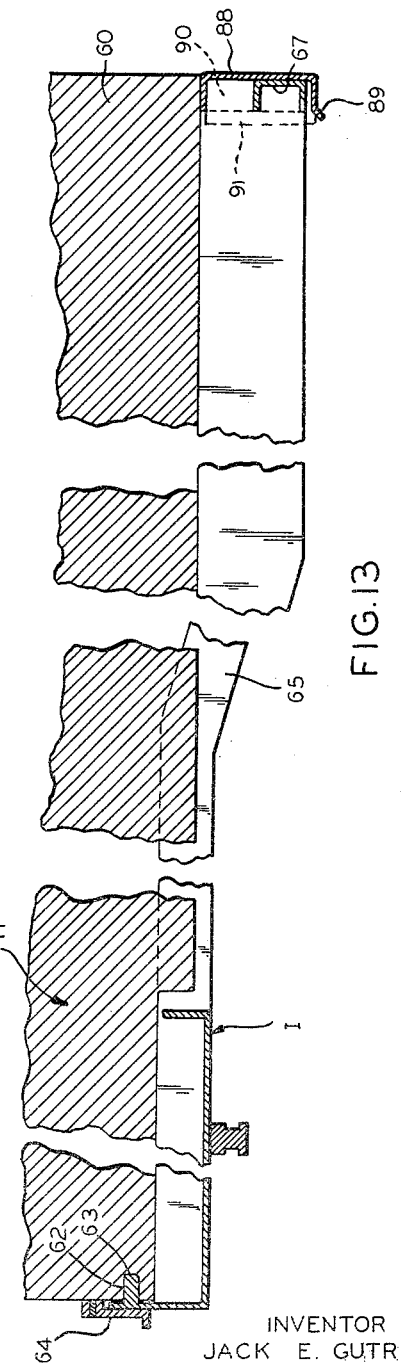

Dec. 25, 1962 J. E. GUTRIDGE 3,070,041
HIGHWAY-RAILWAY TRANSPORTATION SYSTEM AND APPARATUS
Filed Nov. 29, 1957 13 Sheets-Sheet 7
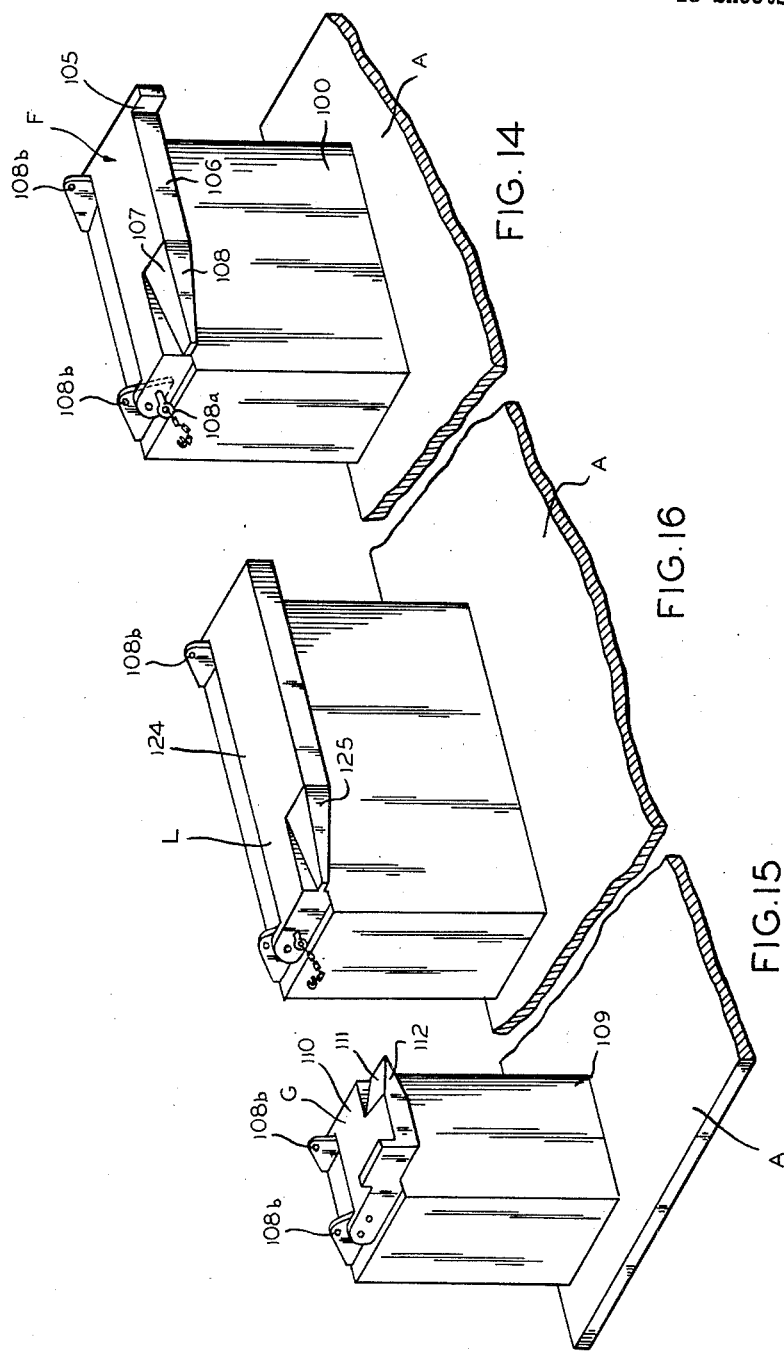
INVENTOR
JACK E. GUTRIDGE
BY *Mann, Brown & McWilliams*
ATTORNEYS

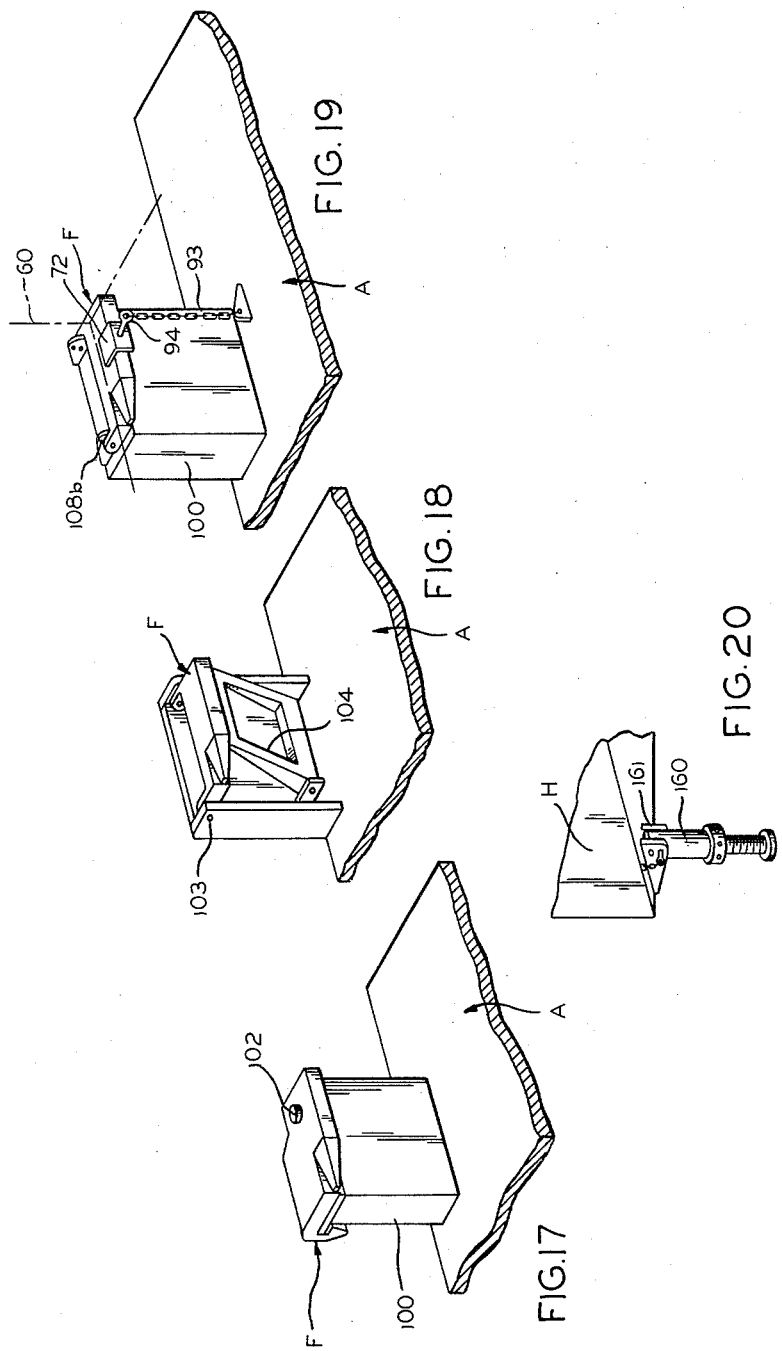

Dec. 25, 1962   J. E. GUTRIDGE   3,070,041
HIGHWAY-RAILWAY TRANSPORTATION SYSTEM AND APPARATUS
Filed Nov. 29, 1957   13 Sheets-Sheet 9

INVENTOR
JACK E. GUTRIDGE
BY Mann, Brown & McWilliams
ATTORNEYS

Dec. 25, 1962   J. E. GUTRIDGE   3,070,041
HIGHWAY-RAILWAY TRANSPORTATION SYSTEM AND APPARATUS
Filed Nov. 29, 1957   13 Sheets-Sheet 10
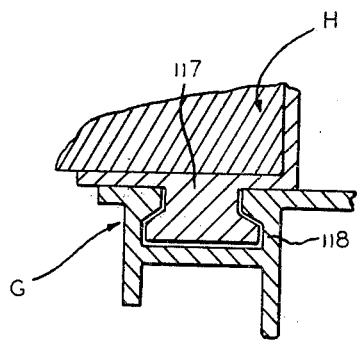
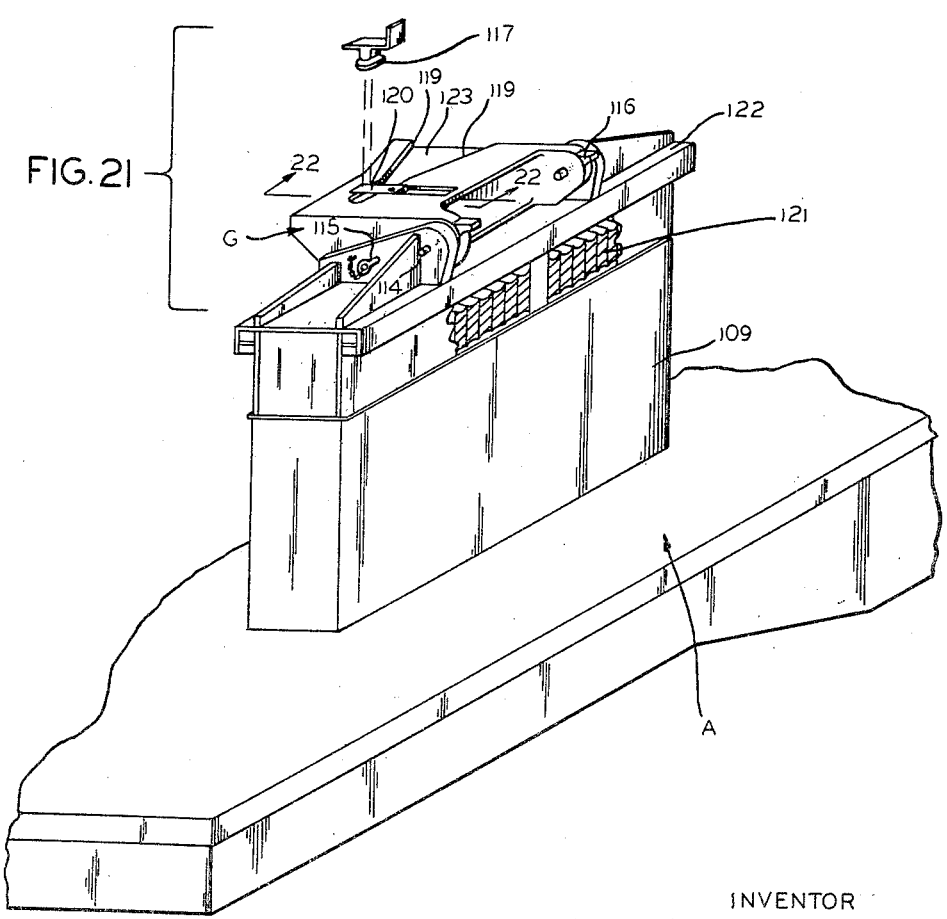
INVENTOR
JACK E. GUTRIDGE
BY *Mann, Brown & McWilliams*
ATTORNEYS Dec. 25, 1962  J. E. GUTRIDGE  3,070,041
HIGHWAY-RAILWAY TRANSPORTATION SYSTEM AND APPARATUS
Filed Nov. 29, 1957  13 Sheets-Sheet 11
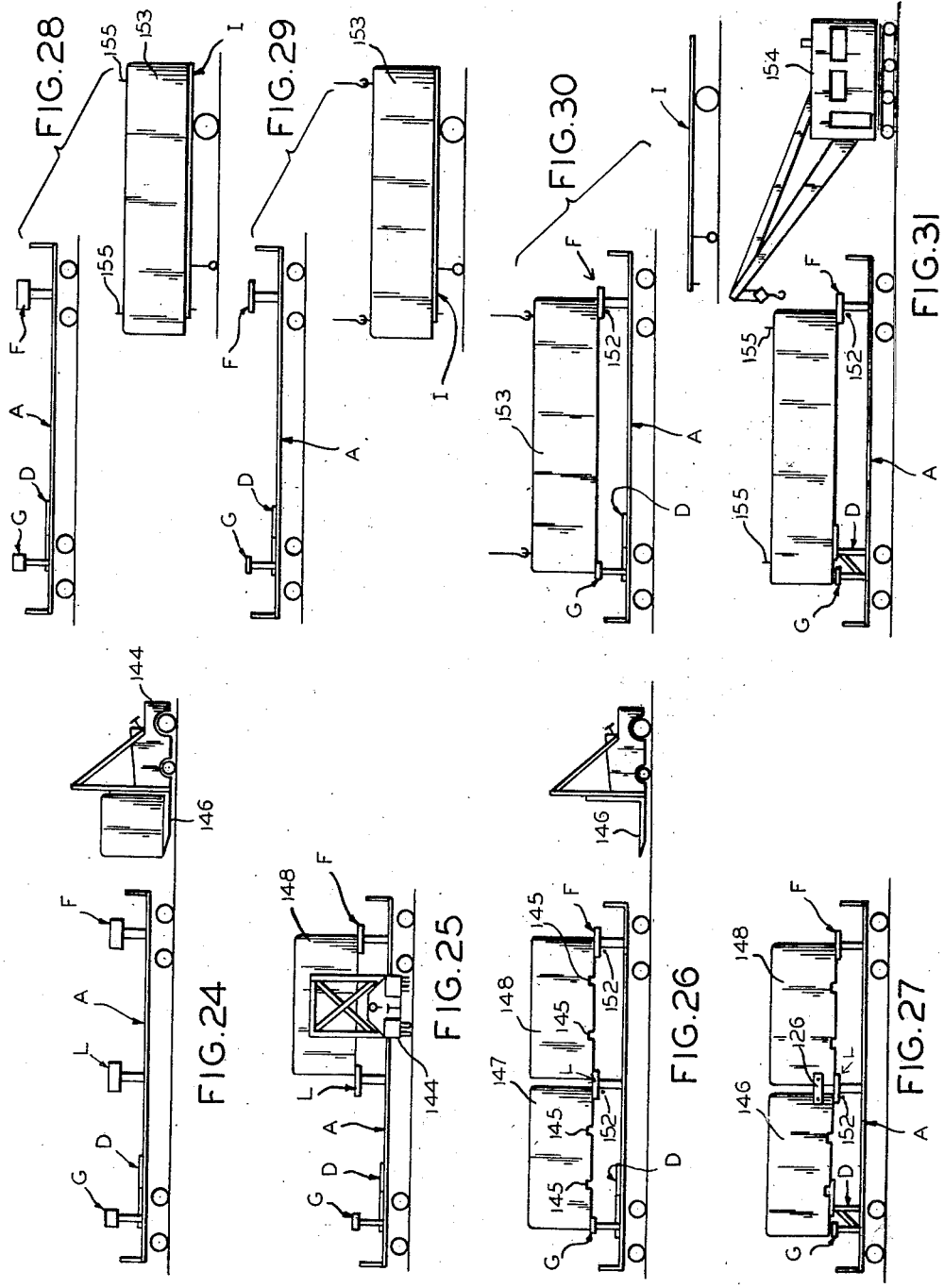
INVENTOR
JACK E. GUTRIDGE
BY Mann, Brown & McWilliams
ATTORNEYS Dec. 25, 1962  J. E. GUTRIDGE  3,070,041
HIGHWAY-RAILWAY TRANSPORTATION SYSTEM AND APPARATUS
Filed Nov. 29, 1957  13 Sheets-Sheet 12

INVENTOR.
JACK E. GUTRIDGE
BY *Mann, Brown & McWilliams*
ATTORNEYS

Dec. 25, 1962 J. E. GUTRIDGE 3,070,041
HIGHWAY-RAILWAY TRANSPORTATION SYSTEM AND APPARATUS
Filed Nov. 29, 1957 13 Sheets-Sheet 13

INVENTOR
JACK E. GUTRIDGE
BY Mann, Brown & McWilliams
ATTORNEYS

United States Patent Office 3,070,041
Patented Dec. 25, 1962

3,070,041
HIGHWAY-RAILWAY TRANSPORTATION
SYSTEM AND APPARATUS
Jack E. Gutridge, Dyer, Ind., assignor to Pullman
Incorporated, a corporation of Delaware
Filed Nov. 29, 1957, Ser. No. 699,759
8 Claims. (Cl. 105—366)

This invention relates to a system for handling railway freight and for easily adapting it for highway travel to and from the railroad shipping yard. This invention also includes the apparatus and equipment used in operating the system.

American railroads are learning that coordinated highway and railway freight handling is a necessity for holding down shipping costs and, like all other industrial concerns, the railroads must keep a sharp eye focused on both equipment and labor costs. It is an obvious inefficiency to load freight onto a highway vehicle; then unload it at the railroad shipping yard; and reload it into a railway car—only to have the same procedure followed in reverse at the point of destination.

A growing trend among the railroads has been to use the so-called piggy-back system, which consists in mounting the semi-trailer of a truck, or in some instances the whole truck, on a railway flat car; transporting it to its destination; and then returning the vehicle to highway service.

In the cases where only a semi-trailer is loaded on the flat car, it is usual to provide a fifth wheel stand, which coacts with the fifth wheel pin on the semi-trailer and supports the forward end of the semi-trailer. The rear end of the semi-trailer rests upon its own wheels, and is generally lashed down.

One drawback to the piggy-back system resides in the fact that during railway transit the truck or semi-trailer merely serves as a support for the load which it carries, whereas, if the load has been transferred to the railway car apart from the semi-trailer or truck, the latter would be available for continued highway service.

Another drawback to the piggy-back system is that the semi-trailers tend to sway somewhat due to the fact that their loads are sprung upon the wheeled axles of the semi-trailer, and even vertical bouncing of the semi-trailer is sometimes objectionable.

In spite of these handicaps, the piggy-back system is growing in popular demand, and many railroads have installed special docks at their shipping yards for enabling the semi-trailers to be driven onto the railway cars that are to carry them.

My improved system combines many, if not all, of the good features of the piggy-back system with other important features and advantages, as will become apparent as this disclosure proceeds. It consists essentially of a system which enables a variety of container loads to be carried on a railway car without the usual loading and unloading of the separate freight pieces, and in its preferred form a special type of semi-trailer is employed which is separable from the load container which it supports. The sytem is entirely compatible with the piggy-back system, and may use the same type of railway cars; but, in the case when the special type semi-trailer is used, the latter is driven onto the car in the same manner as in the case of the piggy-back system, and then the cointainer is supported on the car body, which enables the semi-trailer chassis to be removed and used for additional highway service.

The principal objects of this invention are to provide an improved rail and highway freight transportation system and equipment for use in said system, and among its salient features are the following:

1. *Compatibility*

The system is entirely compatible with the piggy-back system, and the same railway car and loading docks may be used interchangeably for piggy-back loading or loading of our improved type of freight container. The system is also compatible with other highway-railway freight sytems, such as the so-called container system, and other side loading systems, and is even compatible with certain container systems used in ships.

2. *Versatility*

Although one of the particular features of my improved system arises out of tne practical requirement that it be compatible with the piggy-back system, it nevertheless has additional versatility in that when used as a complete system without compatibility with other systems even greater economies may be effected in the handling of highway and railway freight.

3. *Simplicity*

It is a prime requirement in a system of this type that all equipment involved in its adoption and use be relatively simple in mechanical design, so that it may be operated easily and effectively by the unskilled labor that is used in shipping yards.

4. *Low Cost of Equipment*

No system, no matter how economical it may be in operation, would be acceptable to American railroads if it involved large capital expenditures. For example, there are systems of highway-railway freight handling which require side loading of the individual railway cars, but most railroads do not have the yard space for permitting such side loading. To rearrange the yards to accommodate special installations for side loading would involve large capital expenditures, and would be immediately rejected by most railroads. My improved system makes use essentially of present shipping yard facilities that are used in piggyback operation, and the additional equipment that is required is relatively inexpensive.

5. *Protection of Equipment and Lading*

The more rigid securement to the railway car of the freight container used in our improved system, as compared with the type of support used with semi-trailers and trucks in the piggy-back system, tends to reduce lading damage due to uncontrolled oscillations, and increases the life of all of the equipment involved.

6. *Track Clearances and Stability*

Although at first blush it might appear that the load in my system has a relatively high center of gravity as compared with semi-trailers mounted in piggy-back fashion, the fact is that the center of gravity of the load is substantially the same; and, because of the more positive securement of the freight container to the car, there may in some instances be more overhead clearance than in the case of piggy-back cars, particularly when allowances are made in the latter case for the undamped vertical oscillations and swaying due to the sprung load.

7. *Economies of Operation*

There are many economies effected by the use of my system—for example, being able to use the semi-trailer chassis for other highway operation after its load has been transferred to the railway car, the automatic spotting of the rear end of the trailer body or container by the equipment mounted on the railway car, and the adaptability of a single railway car to be used for carrying various types and combinations of container loads without requiring a special type for each form of container.

Further and other objects and advantages of the invention will be apparent as the disclosure proceeds and the description is read in conjunction with the accompanying diagrammatic drawings, in which FIG. 1 shows a plurality of railway cars of different types suitable for use with my system with a truck tractor and semi-trailer being backed into loading position;

FIG. 3 is an exploded perspective view of a railway flat car and the separable semi-trailer chassis and freight container of my invention;

FIG. 4 shows a semi-trailer truck on a flat car with the truck tractor being provided with a hydraulically operated, vertically shiftable fifth wheel assembly for use in conjunction with certain practices of my system;

FIG. 5 is a view similar to FIG. 4, but shows the semi-trailer pulled forward so that the front end of the freight container rests on the front supports of the flat car after the fifth wheel assembly of the tractor has been lowered;

FIG. 6 is a fragmentary elevational view of the front end of the trailer chassis and freight container showing one possible relationship between the kingpin that is used on the chassis and the kingpin used on the freight container;

FIG. 7 is a view corresponding to FIG. 6, but showing a different relationship of the two kingpins;

FIG. 8 shows one manner in which the kingpin on the freight container may be retracted so as not to interfere with sharp turning movements of the truck tractor;

FIG. 9 is an end elevational view of the modification shown in FIG. 8;

FIG. 10 shows another manner in which the kingpin on the freight container may be retracted;

FIG. 11 is a fragmentary horizontal sectional view showing a part of the interlocking mechanism between the freight container and the trailer chassis at the rear end of the latter;

FIG. 12 is a side elevational view showing the manner in which the fifth wheel stand raises a freight container from the front support;

FIG. 13 is a vertical sectional view through the freight container and the trailer chassis showing more of the locking mechanism with parts being broken away;

FIG. 14 shows the preferred form of the rear support;

FIG. 15 shows the preferred form of the front support;

FIG. 16 shows an intermediate support that may be used when more than one freight container is to be mounted on a single railway car;

FIG. 17 shows a modified form of retractable support which in principle may be adapted either to the front support or the back support;

FIG. 18 shows a still further modification of such supports;

FIG. 19 illustrates another manner in which the rear end of the trailer body may be anchored to the railway car;

FIG. 20 illustrates the manner in which retractable jacks may be provided on the container body in lieu of front and rear supports provided on the railway car;

FIG. 21 is a perspective view showing a front support provided with fore and aft cushioning mechanism for use in some practices of this invention;

FIG. 22 is a detailed sectional view showing an interlocking arrangement which may be used between the freight container and the front support for restraining both lateral and vertical movement between the two members;

Figure 47:
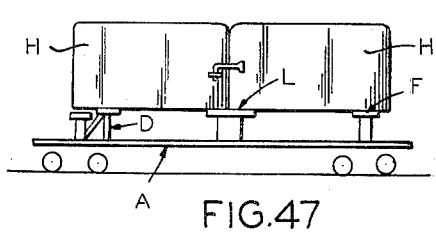
Figure 42:
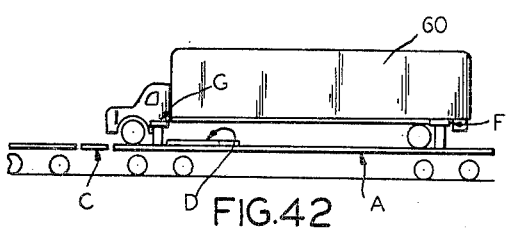
Figure 43:
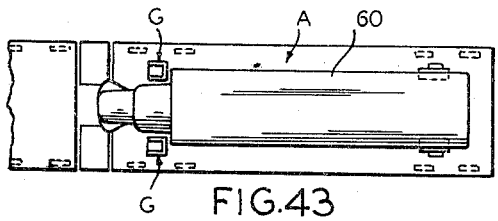
Figure 48:
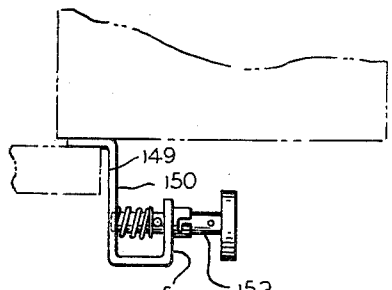
Figure 44:
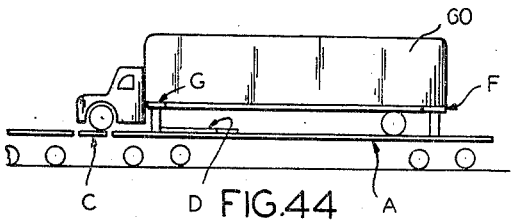
Figure 45:
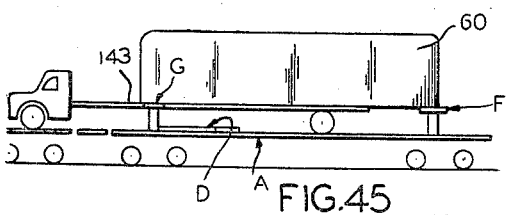
Figure 49:
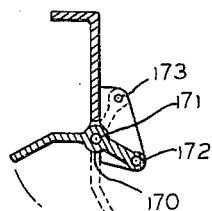
Figure 46:
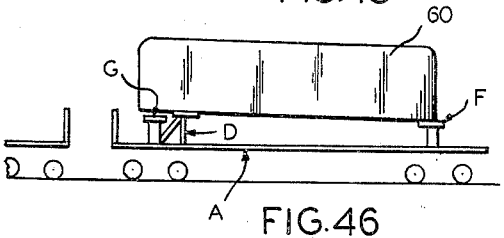

FIGS. 24–27, inclusive, illustrate the applicability of my system to lift truck operation, particularly where multiple freight containers are mounted on a single railway car;

FIGS. 28–31, inclusive, illustrate the applicability of my system to crane loading of a freight container onto a railway car provided with the container carrying equipment of this invention;

FIGS. 32–35, inclusive, are views illustrating the sequence of steps used in loading a semi-trailer in piggyback manner on a flat car equipped with the devices of this invention;

FIGS. 36–40, inclusive, illustrate the sequence of steps which are followed in loading onto a railway car a freight container mounted on a separable chassis in accordance with the teachings of this invention;

FIGS. 41–46, inclusive, show the sequence of steps used in applying the teachings of this invention to a pick-up type truck;

FIG. 47 illustrates the application of this invention to the mounting of multiple freight containers upon a single railway car;

FIG. 48 is a fragmental elevational view showing a modified form of a guide bracket for the freight container; and FIG. 49 is a view showing a modification of the end sill arrangement for the container so that the system is better suited for crane and lift truck operation as well as end loading.

It should be understood that the specific disclosure which follows is for the purpose of complying with Section 112 of Title 35 of the United States Code and the appended claims should be construed as broadly as the prior art will permit consistent with the disclosure herein made.

GENERAL ORGANIZATION

Before describing in detail the various components of my system and the method or system into which they are integrated, it will be helpful, first, to set forth in a more or less general way the basic components of the system and describe at least a preferred method for the system to operate.

Figure 1:
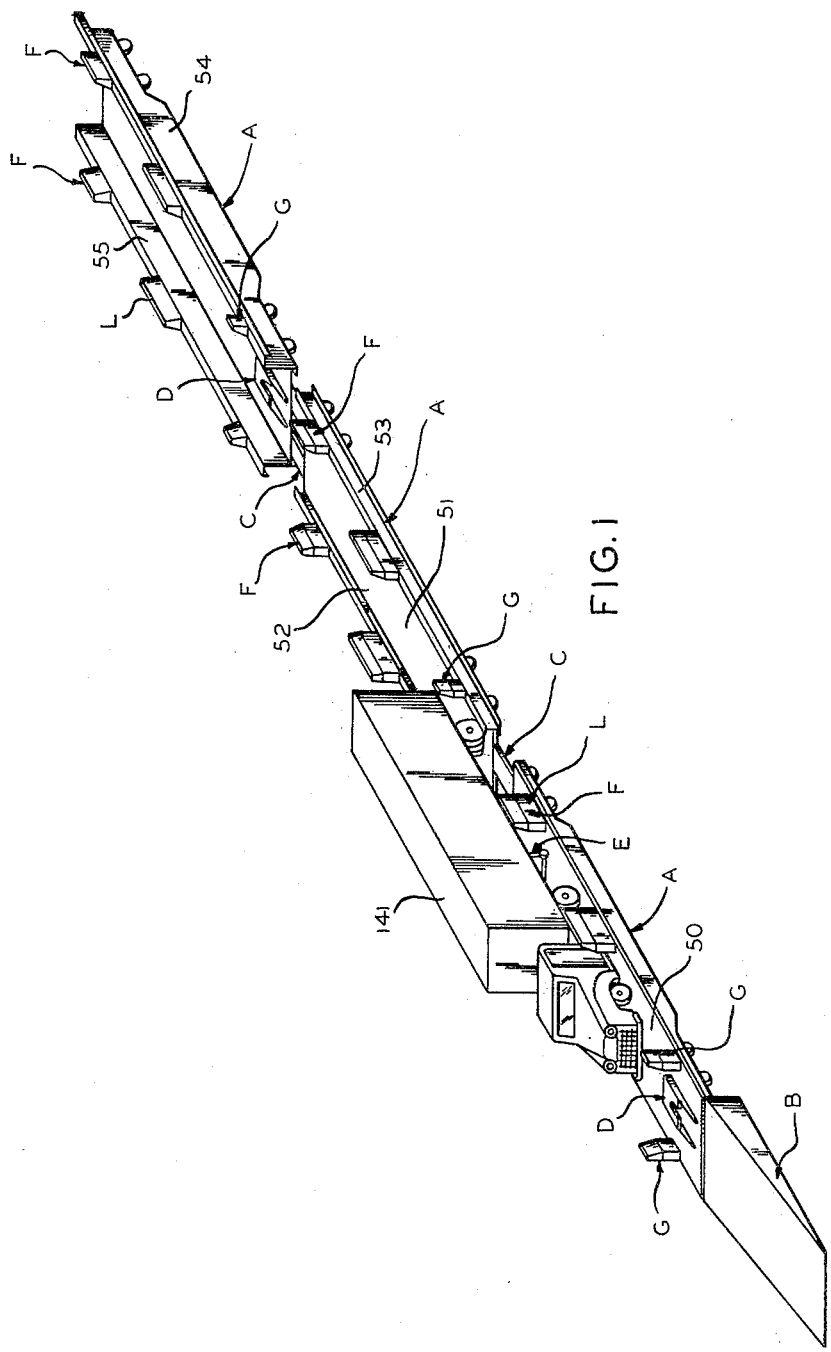
Figure 2:
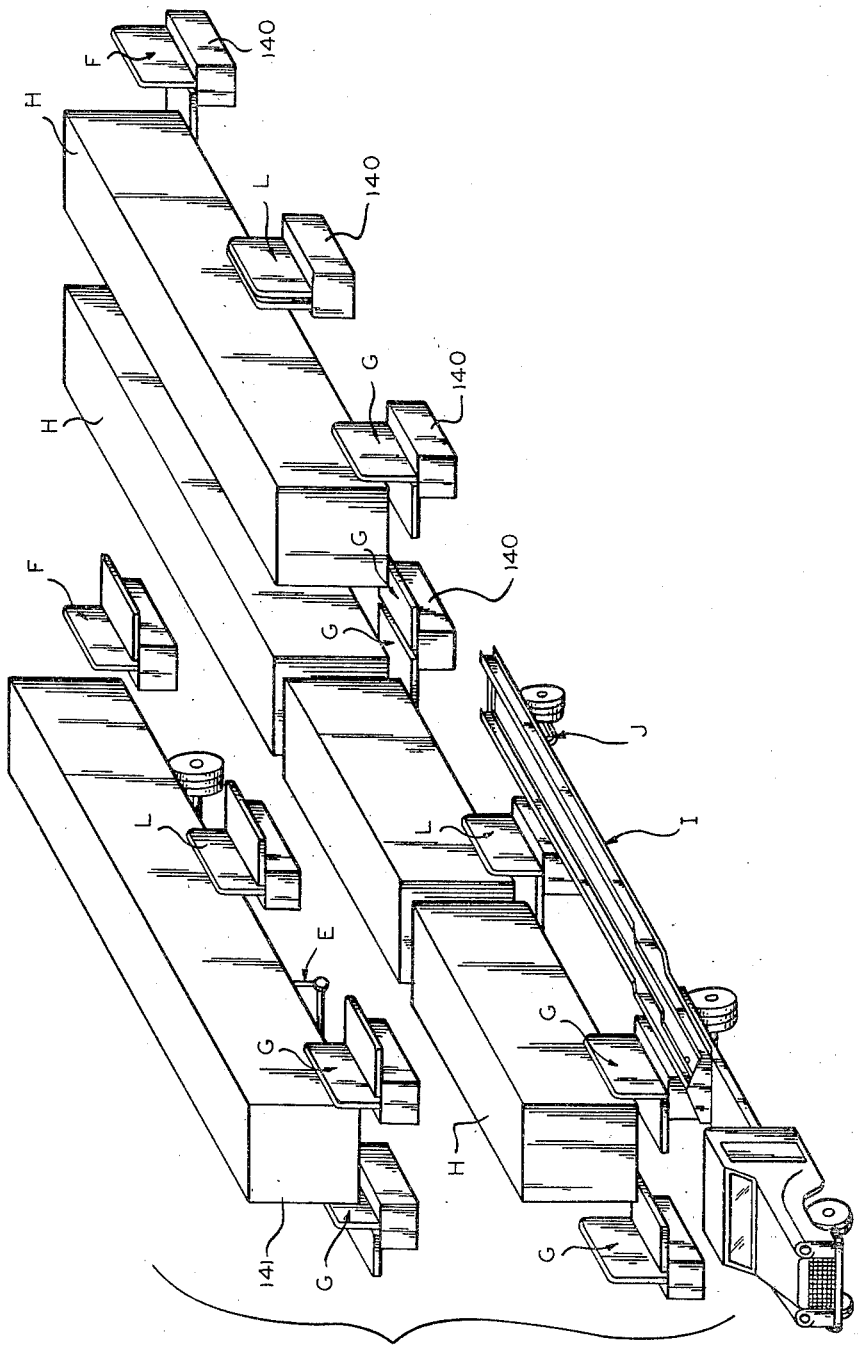
FIG. 2 is a composite view of a shipper's yard showing various ways in which the freight containers of my invention may be stored ready for pick-up by the specially designed truck chassis.

Disregarding for the moment the shipping facilities which are preferably provided at the point where freight is loaded onto the highway vehicle prior to being transported for shipment on a railway car, it will be noted, by reference to FIGS. 1, 2 and 3, that the shipping yard facilities at the railroad may consist of a single track upon which a number of flat cars or other special cars are positioned in coupled relation, these cars being generally designated A.

At the end of the track is a ramp B, and interconnecting the ramp with the adjacent car and interconnecting subsequent cars are retractable sills generally designated C.

Each of the cars A is essentially a flat car, so that a truck or semi-trailer may be moved across its deck; but the cars may be, in some instances, modified gondola cars, flat cars with a special type of side frame, or other special cars particularly suited for their intended usage. Every car which is to be used for piggy-back service is provided with a fifth wheel stand generally designated D, and this is used to support the fifth wheel pin of the semi-trailer.

Conventional practice is for the truck tractor with its semi-trailer to back up the ramp B, and from car to car over the sills C to the last car in the series, whereupon the truck tractor is disconnected in the usual manner, allowing the front of the semi-trailer to rest upon its landing wheels E, after which the truck tractor is driven off the cars, and the front of the semi-trailer is picked up by the fifth wheel stand D to support the front end of the trailer during travel of the railway car.

In order to make the cars A alternatively usable with the novel system herein disclosed, retractable shelves or load supports are provided at the rear of each car on opposite sides thereof, these being generally designated F. Similar retractable supports G are provided near the front end of the cars, and both front and rear supports G and F, when in their retracted positions, permit piggy-back operation in a conventional manner.

The preferred special type of semi-trailer used in our improved system combines a freight or load container H mounted upon a special trailer chassis I (FIG. 3). The container body H is a completely rigid structure, and does not require the trailer chassis I to enable it to be supported at opposite sides of its rear end and opposite sides of its front end, or at the center of the front end. The trailer chassis I is preferably supported on its wheeled axles by air springs J, for reasons which will be later explained.

The truck tractor for the semi-trailer just described is preferably provided with hydraulic mechanism K (FIGS. 4 and 5) or equivalent mechanism for changing the elevation of the fifth wheel with respect to the ground, as this is a considerable convenience in the use of the equipment in my system.

When the special trailer of my system is to be transferred to a railway car, the trailer is backed onto the cars A, using the motive power of the coupled truck tractor in exactly the same manner as in the piggy-back system, with the front and rear supports G and F of the cars through which the unit must pass in reaching the car for loading being retracted to permit free transit. The car which is to be loaded has its rear supports in operative position; that is, in horizontal position; and, as the trailer is back onto this car, suitable guide, members on opposite sides of the rear end of the trailer co-act with the rear supports F to center the rear of the trailer over the car end and place the rear end of the trailer on these supports. The trailer is moved back on these supports a sufficient distance so that the front end of the trailer clears the front supports G, after which the front supports are moved to their operative horizontal position, the lift mechanism K for the fifth wheel plate of the tractor is raised, and the trailer is moved forward by the tractor until the front end of the trailer body or container is located above the front supports G. The rear supports are of sufficient length longitudinally of the car so that the forward movement of the trailer over the front supports G will not disengage the rear supports F from the rear end of the trailer. Thereupon, the fifth wheel plate of the tractor is lowered to permit the trailer body to rest upon the front supports G, and simultaneously, or subsequently, the air is let out of the air springs J in order to have the rear support F support the load of the trailer body.

The lowering of the fifth wheel plate of the tractor and the removal of air from the air spring system enables the trailer chassis, after the release of suitable locking mechanism, to be pulled out from beneath the container H, and the truck and trailer may be driven off the car and used for other service. If the truck tractor does not have a vertically adjustable fifth wheel plate, the chassis can nevertheless be pulled out in a manner to be later described.

The container H is provided with a kingpin that is properly located with respect to the fifth wheel stand on the railway car, and the latter is raised into engagement with the kingpin and beyond, so that the front end of the trailer body is then supported on the fifth wheel stand rather than upon the front supports G.

For unloading, the reverse sequence of steps is followed.

The above is but a brief description of the general organization of the system, and there are many variations and modifications, as will hereinafter be pointed out.

*Railway Car*

One of the outstanding advantages of my system is the fact that various types of existing cars can be easily modified to make use of my system, including particularly conventional flat cars 50 (FIG. 1), which are already equipped with fifth wheel stands for piggy-back operation; and, of course, any standard flat car may be provided with such a stand and the container supports for use in our system.

It is also contemplated that certain special types of flat cars 51 may be used in which the floors 52 are depressed below the side sills 53 in order to provide more ample overhead clearances for the loads to be carried by the car.

Also, it is possible to take a standard gondola car, such as indicated at 54, and, by removing the ends, the sides 55 of the car form convenient mountings for the rear and front supports F and G, which carry the freight container, as well as intermediate supports 56, which are used when multiple containers are carried on the same car.

Another advantage of the gondola car is that the rear and front supports F and G, as well as the intermediate supports 56 may, if desired, be made adjustable along the top of the gondola sides for greater versatility in carrying multiple container loads.

*Highway Vehicle*

A. SEMI-TRAILER TYPE

My invention is most advantageously employed when the highway vehicle is of the semi-trailer type, although it is not limited to such type. Referring now to FIG. 3, it will be seen that the freight container H is a rectangular box-like structure 60, and is provided with the structural strength necessary for it to be carried on the railway car at its four corners, or alternatively, with the front end of the container body being supported on the fifth wheel stand D. The freight container 60 has a separable connection with the semi-trailer chassis I, and to this end it is provided with a U-shaped member 61 into which the rear end of the trailer chasis I slides; and at the front end of the freight container is a recess 62 adapted to receive a pin 63 provided on the front end of the trailer chassis to lock the freight container against vertical separation from the chassis. Longitudinal movement of the freight container 60 with reference to the trailer chassis I is prevented by a rotatable lock 64, as best shown in FIG. 13.

The trailer chassis I comprises essentially a pair of longitudinal beams 65 rigidly connected at their front and rear ends by members 66 and 67, respectively, to form an underframe; and this underframe is mounted on one or more wheeled axles 68 with suitable springs interposed therebetween, preferably air springs, such as indicated at 69. The air springs 69 may be of any suitable form, but preferably have approximately a three-inch travel; and the air spring system is provided with a relief valve (not shown) which enables the air from the spring to be quickly removed without interfering with the pressure in the main air reservoir commonly provided with air spring system.

The chassis I is provided with a retractable landing gear, as usual with semi-trailers, and has a kingpin 71 projecting from the fifth wheel plate structure shown in FIGURES 6 and 7 for cooperation with the fifth wheel plate of the truck tractor, yet to be described.

The freight container 60 is provided at its rear end, on opposite sides thereof, with outwardly directed angle brackets 72 for cooperation with the rear supports F of the railway car; and at the front end of the container, on opposite sides thereof, are blocks 73 for cooperation with the front supports G of the car.

Preferably, the front end of the freight container 60 is recessed, as shown at 74, to receive the raised front portion 75 of the underframe on the trailer chassis that includes the fifth wheel plate structure shown in FIGURES 6 and 7, but a tongue 76 extends forwardly from the bottom of the freight container and has adjacent its ends a kingpin 77 for cooperation with the fifth wheel stand on the railway car.

The positioning of the freight container kingpin 77 presents somewhat of a problem because if it is made level with the trailer chassis fifth wheel kingpin 71 (i.e., projects downwardly through the underframe I between the longitudinal frame members 65) there is a possibility of its conflicting with the truck tractor wheels during sharp turning movements. There are a number of ways in which this problem may be met, and these are shown in FIGS. 6–10, inclusive.

In FIG. 6, the tongue 76 of the container 60 is omitted, and the container kingpin 78 projects from the recessed portion 74 of the container. In this case, the kingpin is sufficiently high so that it will not conflict with the tractor tires, and all that is required is that the fifth wheel stand D on the railway car be lifted to a slightly higher elevation in order to engage this kingpin.

In FIG. 7, the tongue 76 is not quite so deep, so that the kingpin 79 in this instance is at a slightly higher elevation than the kingpin 71, and does not conflict with the tires.

Alternatively, the kingpin could be mounted in axial alignment with the trailer chassis fifth wheel kingpin 71, as shown in dotted lines in FIG. 7; and in this case the container kingpin indicated at 80 would be retractable to a flush position within the container body by means of a simple screw threaded connection in a manner best shown in FIG. 10.

There is one advantage in having the container kingpin 80 in axial alignment with the fifth wheel kingpin 71 in that the container load will be carried in exactly the same position on the railway car as would be the case for piggy-back operation. When the trailer chassis fifth wheel kingpin and the freight container kingpin are longitudinally spaced (which normally would not be more than 24"), the fifth wheel stand is positioned so that its normal raised position is halfway between the two kingpins. This means that in the case of piggy-back operation the semi-trailer is located approximately one foot back of its normal position on the car, and in the case of my special semi-trailer the position of the load is approximately one foot forward of the normal position.

There are many ways in which a container kingpin may be made retractable so that it will not interfere with the truck tractor tires, one such means being disclosed in FIGS. 8 and 9, in which the kingpin 81 is pivoted about a center 82, so that it may be retracted to the position shown in dotted lines, or extended to its operative position as shown in full lines. A pin or bolt 83 may be used to lock the kingpin in its extended and retracted positions.

In FIG. 10, the kingpin 84 has a threaded end engageable with an internally threaded collar 85 mounted in the container body for vertical adjustment to and from operative position.

The fifth wheel stand on the railway car has its forward face angularly slotted, as indicated at 86, to guide the supporting kingpin to its final position at 87. When the kingpin is properly located within the portion 87 of the slot, a suitable locking mechanism holds it in place, as is conventional.

Although in FIG. 3 a U-shaped bracket 61 has been shown to receive the end of the chassis underframe, this is more or less diagrammatic, and in actual practice the rear end of the container 60 may be provided with a depending end sill 88 (see FIGURES 11 and 13), the lower flange of which is inclined downwardly, as indicated at 89, to help guide the underframe into position when the two are being united (FIG. 13). Lateral positioning of the underframe with respect to the container body 60 is achieved by webs 90, which are welded or otherwise secured to the end sill 88 at appropriate spacing, and these webs are inclined outwardly, as indicated at 91, to aid in guiding the underframe into its locked position within the pocket generally indicated at 92. After the two have been united and the pin 63 at the front of the underframe has been fitted into the opening 62, the locking bar 64 is swung to locking position, and the container is firmly locked on the underframe.

Obviously, many other arrangements may be used for providing a sliding separation between the container 60 and the trailer chassis I, and the structure just described is purely illustrative of this function.

The truck tractor is preferably, though not necessarily, equipped with a hydraulically operated elevating mechanism for its fifth wheel, as shown at K in FIGS. 4 and 5. This mechanism is conventional in its utility with my system, and will be described in the operation of the system.

B. PICK-UP TYPE

Our invention is not limited to the use of semi-trailer type trucks, but may be used equally well with trailers having wheels at both ends or pick-up trucks. In each instance, of course, the container body would be separable from the chassis which supports it is a manner similar to that described with reference to the semi-trailer type, although some modification in the locking mechanism or its location might be required (i.e., the rotary lock 64) because of clearance problems.

Further description of the manner in which a pick-up type truck would be used with my system will be deferred until the operation of the system as a whole is described, particularly with reference to FIGS. 41–46, inclusive.

Rear Supports

The rear supports F in the case of the conventional flat car 50, or the special type flat car 51, are mounted on stanchions 100, rigidly secured to the underframe of the car adjacent to the rear end thereof. The rear supports must be retractable in order that they may be held in an out-of-the-way position when the cars are used for normal piggy-back service, and there are many ways in which they may be made retractable.

Preferably, the rear supports are mounted on the rear stanchions 100 by horizontal pins indicated at 101 in FIG. 3. When in retracted position, they may either swing to a vertical, raised position, or, if desired, they may be made to swing to an out-of-the-way position on the outside of the stanchions.

Alternatively, the rear supports could be supported on the stanchions by a vertical pin, such as shown at 102 in FIG. 17, or they might be pivoted about a pin 103 to a retracted position inside of the stanchions, and be held in operative, horizontal position by a suitable stand or linkage 104, as shown in FIG. 18. These alternate methods of providing retractability for the rear supports (and they are equally applicable to the front supports G as well) merely serve to illustrate a variety of devices which may be used in conjunction with my system.

Ordinarily it is desirable to lock the container supports against upward movement, and this may be done by pins, such as shown at 115 in FIG. 21, or by removable chains 93, as shown in FIG. 19, anchored between the floor of the car and eyes 94 rigid with the container 60 (compare FIGURES 3 and 19).

The principal functions of the rear supports when in their horizontal, operative position include one or more of the following:

(1) To provide a back stop for limiting rearward movement of the truck or trailer while it is being backed into position for transfer of the load container to the railway car supports.

(2) To provide, in conjunction with suitable cooperating indexing devices on the freight container 60 (such as the angle brackets 72), lateral indexing of the rear of the freight container with reference to the car, and to prevent lateral movement of the freight container with respect to the car during transit.

(3) To provide a support surface for the rear of the container 60.

(4) To provide in some instances a ramp action for slightly lifting or lowering the freight container with respect to the supporting chassis while the combined unit is being backed onto the car.

Merely by way of illustrating how these functions may be incorporated into a rear support, reference is made to FIG. 14, in which it will be seen that the inward flange 105 (which could be upstanding or downwardly directed) at the rear of the support serves as a back stop; the edge 106 in cooperation with the angle bracket 72 serves as a lateral indexing of the body 60 with reference to the car (the springing of the freight container 60 on the wheeled axles permits a slight shifting laterally for this action to occur); the ramp section 107 at the front end of the support provides the means for slightly raising or lowering the freight container 60 with respect to the chassis and for leading the rear end of the container onto the support; and the tapered edge 108 of the ramp section 107 serves as a guide in obtaining coaction between the brackets 72 and the support.

Since the horizontal, outwardly projecting flanges of the brackets 72 are positioned below the rear supports F, the freight container 60 is held against vertical movement with respect to such supports, and, of course, any suitable device, such as a chain or pin, may be used to lock the rear supports F against rising action within their operative position, as shown at 108a. The same pin may be used to hold the support in inoperative position in cooperation with the hole 108b.

In the case of modified gondola cars, the sides of the car may be suitably braced to act in the place of the stanchions 100 and, if desired, the rear supports, as well as all other supports, may be made adjustable along the length of the sides of the gondola car.

Front Supports

The front supports may be mounted on their stanchions 109 in the same variety of ways which have been described with reference to the rear supports, and it should be remembered that the front supports are in their retracted position while the truck or semi-trailer is being backed into engagement with the rear supports F. When the truck being loaded comes into engagement with the back stop 105 on the rear support F, the front end of the freight container 60 is clear of the front supports G, and these supports may then be moved to their operative, horizontal position. Thereafter, the truck load is moved forward so that the front end of the freight container 60 rides onto the front supports G, after which separation between the freight container 60 and the chassis I is effected, and the truck is pulled off of the car.

The basic functions of the front supports include one or more of the following:

(1) To slightly lift the front end of the container 60 with reference to the chassis I.

(2) To laterally index the freight container with reference to the railway car.

(3) To serve in most instances as a temporary support for the front end of the freight container while the carrying chassis is being removed from the car.

(4) To provide a front stop for limiting forward movement of the container as it is being moved into position for separation from the chassis, and while the chassis is being pulled out.

(5) To prevent accidental rearward movement of the freight container off the front supports.

As in the case of the rear supports, there are many forms which the front support may take, but by referring to FIG. 15 it will be seen that the top surface 110 serves as a support surface; the ramp portion 111 serves to simultaneously lift the freight container with reference to the chassis as the truck is moved forwardly (unless the front of the container has previously been raised by hydraulic lift of the fifth wheel assembly on the truck tractor); the outwardly inclined wall 112 (i.e. outwardly with respect to the car) tends to index the freight container laterally with respect to the railway car in cooperation with the inner faces of the blocks 73; and the upstanding wall 113 serves as a front stop.

When my system is employed as a compatible system with piggy-back operation, the front supports G are merely used as temporary support and holding means for the front end of the freight container while the truck chassis is being removed. When compatibility is not required, there is no occasion to have a fifth wheel stand D, and in that event the front supports G are used as permanent supports for carrying the front end of the container during transit.

Referring to FIGS. 21 and 22, a front support arrangement is shown which is particularly suitable for use as a permanent support for the front end of the freight container while in transit; and it will be obvious that some of the structure therein disclosed has equal applicability to the rear supports F.

In this instance, the front support is of the flip-down type, which swings about a pivot 114 and may be held in its down position by a pin 115. In its retracted position, the stops 116 limit clockwise rotation when viewed from the front end of the car.

In this instance, the freight container has secured to its lower side a headed pin 117 which travels in an undercut slot 118 provided in the upper face of the front support. Entrance of the pin 117 into the undercut slot 118 is guided by the tapered walls 119, and once the pin is in its forward position it may be locked in place by a plate 120.

In piggy-back operation, it may be desirable to provide the fifth wheel stand with some type of fore and aft cushioning to yieldingly resist buff and draft forces applied to the car, and for a like reason the front support shown in FIG. 21 is preferably provided with a suitable cushioning mechanism, indicated generally at 121. The framework 122 which supports the plate G is movable relative to the stanchion 109 and interengages the cushioning mechanism to provide the desired cushion movement.

Instead of providing the cushioning mechanism in the front support G when the container load is being carried in transit on the front and rear supports G and F, it could equally well be provided in the rear supports F.

The cushioing mechanism should normally provide at least 8" of travel in either direction, but our arrangement permits any amount of cushioned travel that may be desirable within the length of the railroad car, merely by making the car supports of sufficient length.

Obviously, the camming action for slightly lifting the freight container 60 while the truck is being moved forward into position may be effected either by inclining the surface 123 to provide a ramp, or the inclined surface may be on the blocks 73 when the type of front support is used that is illustrated in FIG. 15. The same reversal of parts is possible with respect to the rear supports.

There are some instances in which it is desirable to lock the freight container against rearward movement even when the front supports G are used as temporary supports. The form of front support shown in FIGS. 21 and 22 accomplishes such function by means of the plate 120. Equivalent structure may, of course, be used.

Intermediate Supports

An intermediate support L is shown in FIG. 16, and this type of support is used when the freight container 60 is in two units. Obviously, if more units were provided, more intermediate supports could be provided.

The intermediate supports are retractable in any of the ways which have been previously described with regard to the front and rear supports, and their basic requirement is to provide a horizontal supporting surface 124 and preferably a slight ramp section 125 to guide the freight containers onto the support.

Since in transit multiple freight containers are suitably linked together, as indicated at 126 in FIG. 27, side stops on the intermediate supports are normally not required, but may be provided if thought necessary.

*Relative Lengths of Supports*

Whether the cushioning mechanism for resisting buff and draft shock loads is mounted in the fifth wheel stand D or in the front or rear supports G and F, if it is desirable to provide about 8" of fore and aft movement by way of example, this would mean a total of 16" travel in all. Allowing for 2" of over-travel in either direction, this means that the rear support F should have a length of approximately 20".

The front supports G, when used only as temporary supports prior to the engagement of the fifth wheel stand D with the freight container kingpin 71, need only be approximately 10" long, or even less, because their principal function is to serve as a temporary support for the front end of the freight container when the truck is being moved forward to release the chassis.

The intermediate supports L must obviously be longer than the rear supports, because they not only must support the ends of the adjacent containers but also allow for 8" of travel in either direction plus a tolerance of 2".

When the front supports G are used as permanent supports for the front end of the container body (with the fifth wheel stand D being eliminated), and with either the front supports or the rear supports containing the cushioning mechanism, the front supports must, of course, be substantially the same length as the rear supports.

*Fifth Wheel Stand*

Although any fifth wheel stand commonly used today may be employed with my system, we prefer to use a stand of the type in which the fifth wheel plate 130 is lifted on a radius about a center 131 (FIG. 3) for engagement with the kingpin structure. I also prefer to have cushioning mechanism, such as indicated at 132, located intermediate the kingpin 77 and the stand, such as shown in FIG. 12, and this preferably permits 8" of cushioned travel in either direction, or more if desired.

It will be understood that the fifth wheel stand may be either manually operated or hydraulically operated.

Figure 23:
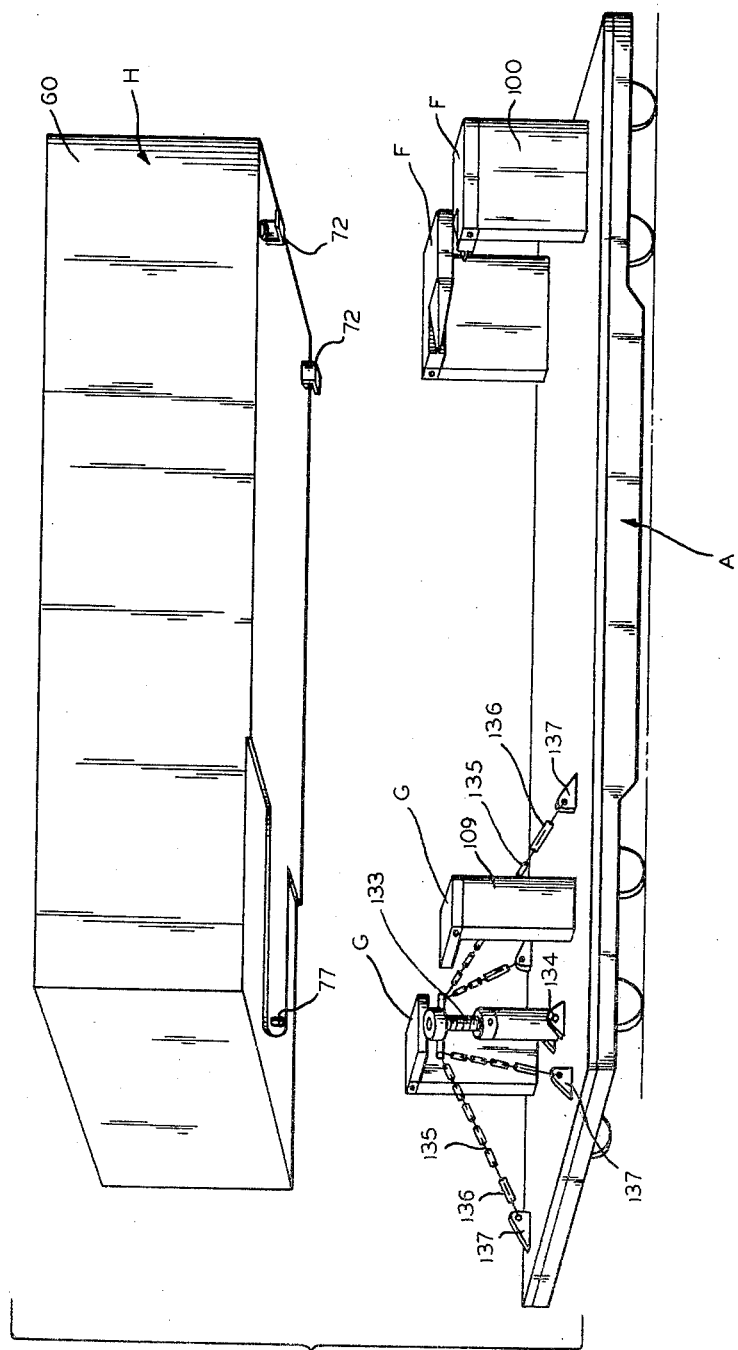
FIG. 23 is an exploded view showing a different form of fifth wheel stand together with cushioning mechanism therefor.
Figure 32:
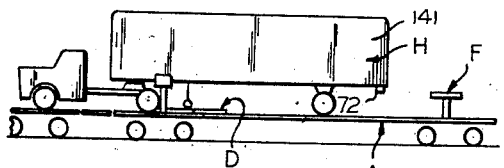
Figure 36:
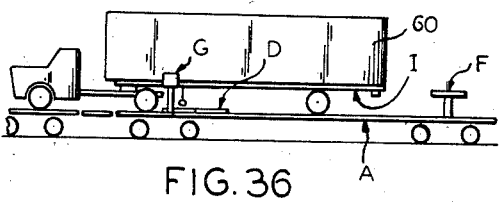
Figure 33:
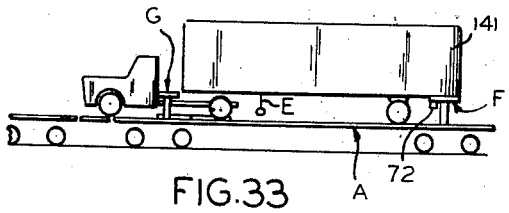

Another type of stand which may be used with my system is of the so-called jack type shown in FIG. 23, which consists primarily of a screw jack 133 which may be swung to inoperative position about a pin 134, and when in operative position is held in place by diagonal chains 135 with spring means 136 interposed between the chains and anchors 137.

*Loading and Unloading*

A. YARD FACILITIES

The typical railroad yard facility for loading piggyback trailers on cars has already been described with reference to FIG. 1, but it should be mentioned that at the railroad yard, as well as at the shipper's yard, retractable front, rear, and intermediate supports (G, F, and L, respectively) may be provided at convenient locations on permanent stanchions 140, as shown in FIG. 2, for storage of containers H ready for pick-up as the occasion requires. These same storage spaces may be used for conventional semi-trailers, such as shown at 141, merely by retracting the supports to their inoperative position. All of this is shown adequately in FIG. 2.

*Procedures for Piggy-Back Loading*

Using railway cars equipped with the front and rear supports of this invention for piggy-back loading requires no changes whatsoever in procedures, all that is required being that the front and rear supports be in their inoperative position.

However, if desired, some advantage may be gained from the equipment on the car, even with piggy-back loading, by placing the rear supports F in their operative position, and providing suitable inter-engaging equipment on the rear ends of the piggy-back trucks for engagement with these rear supports. With these rear supports slightly lifting the rear end of the trailer body with respect to its chassis and with the inter-engaging means consisting, say, of brackets such as 72, as provided on our special container body, the rear end of the trailer is thereby anchored against swaying and against vertical bounce, which in some instances might allow a piggy-back trailer to traverse a track area of close overhead tolerances, which it otherwise could not clear.

Even the front supports G may be used to advantage in normal piggy-back operation by lowering them to operative position after the semi-trailer has been pushed to its rearmost position, and then pulling the trailer forward onto the front supports, again using suitable interengaging devices or surfaces at the front end of the trailer body. The front supports then enable the truck tractor to disengage itself from the semi-trailer without going to the trouble of lowering the landing gear 70 into supporting position; and, after disengagement of the truck tractor, the fifth wheel stand may be raised to carry the front end of the semi-trailer.

All of this is shown in progressive steps in FIGS. 32–35, inclusive, and further description is thought unnecessary.

*Procedures for End Loading of Railway Cars Using Special Type Semi-Trailer*

Figure 37:
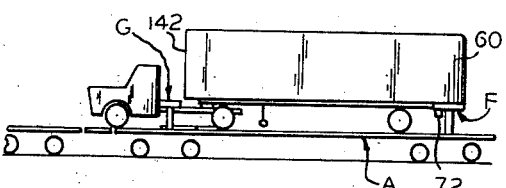
Figure 34:
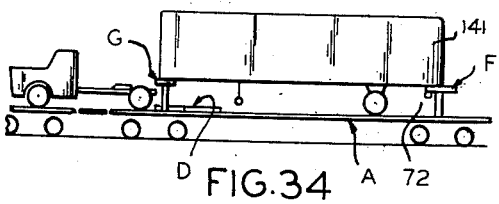
Figure 38:
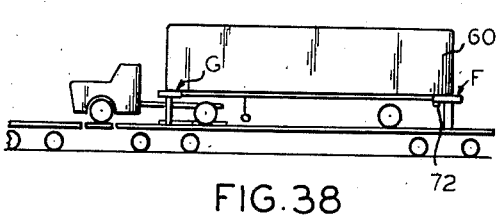
Figure 35:
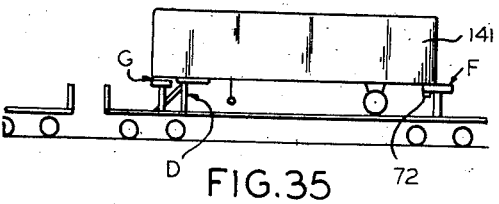
Figure 39:
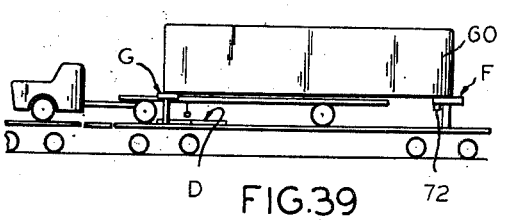

The sequence of steps for loading a single freight container 60 onto a railway car in accordance with my system is shown in FIGS. 36–40, inclusive. As there shown, the front support G is in raised position (FIG. 36) while the special trailer and container are moved rearwardly onto the car, and the rear support F is in its operative position. When the semi-trailer has been pushed to its rearmost position, the front end 142 of the trailer is clear of the front support G, which is then lowered to operative position, as shown in FIG. 37. The truck is then pulled forward to place the front end of the freight container 60 onto the front support G and against its forward stop. The air from the air springs J is then released, which places the load of the freight container 60, or a substantial part thereof, on the rear supports, and the locking mechanism 64 is then released. If the truck tractor has a vertically shiftable fifth wheel assembly, it is then lowered to place a substantial part of the weight of the front end of the container 60 on the front supports G; but, even without lowering mechanism for the fifth wheel assembly on the truck tractor, the release of air from the air springs J places a sufficient part of the load of the container on the car so that the truck tractor may pull the chassis out from beneath the container, as shown in FIG. 39. The front limit stops on the front supports prevent the freight container 60 from moving with the chassis, and obviously, once the separation has been started, the frictional resistance becomes less as the depressed lower end of the chassis comes adjacent to the front supports G.

Figure 40:
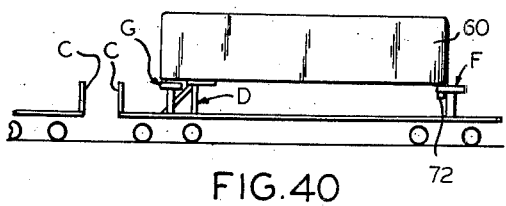
Figure 41:
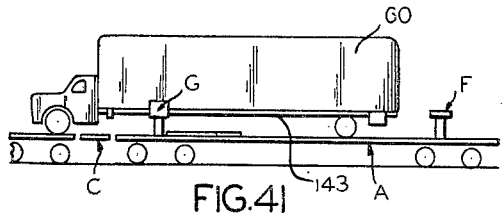

After the truck tractor with its trailing chassis has been removed from the car, the fifth wheel stand D is elevated to engage the kingpin on the freight container and lift the front end of the container off the front supports G, as shown in FIG. 40. The sills C may then be lifted, and the car is ready for transit.

Although the use of air springs J constitutes a convenient means for lowering the truck chassis with reference to the freight container 60, it should be understood that my invention is not limited to the use of air springs. It is possible to use conventional leaf or coil springs, and make use of the ramp action of the rear supports while the truck is being backed upon the car to lift the truck body a sufficient distance to relieve the greater part of the spring loading; and, even when the truck tractor is not provided with an elevatable fifth wheel assembly, the front end of the container 60 may be cammed onto the front supports G by the rearwardly facing ramps 111 provided on these supports. The locking mechanism can then be released to separate the chassis from the container, and the chassis pulled out by the truck tractor.

Obviously, when the truck tractor is provided with an elevatable fifth wheel assembly, the task of pulling out the chassis I is eased.

*Procedure for End Loading of Railway Cars Using Special Type Pick-Up Trucks*

In the case of pick-up trucks built for use with my system, the procedure is substantially the same, as will be seen by referring to FIGS. 41–46, inclusive.

The pick-up truck is backed onto the car while the front supports G are in their inoperative position and the rear supports F are in their horizontal, operative position. The rear end of the freight container rides up on the rear support F as the truck is moved rearwardly a sufficient distance to clear the front supports G, after which these latter supports are lowered to their operative position and the truck moved forwardly onto the front supports, making use of the camming faces 111 of the front supports to lift the container slightly with reference to the wheels which support the truck.

In case the truck is provided with air springs, as is preferred, little camming action, if any, is required for moving the rear of the freight container onto the rear supports F; but, if leaf or coil springs are used, the rearward movement of the truck onto the car is used to cam the rear end of the container onto the rear supports and relieve to some extent the load on the chassis. The lift on the container, even so, is only an inch or slightly more.

Obviously, some type of a lifting device may be provided between the front end of the container 60 and the pick-up truck chassis 143, such, for example, as a collapsible air bellows of the air spring type (not shown, but similar in construction to the air spring J), so as to provide the equivalent of a hydraulically operated fifth wheel stand lift mechanism as used on semi-trailers. In such a case, after the pick-up truck container 60 has been placed upon the front and rear supports G and F, respectively, and release of the locking mechanism and air from the air springs (which would include the collapsible bellows between the front end of the freight container and the chassis 143) has been effected, the pick-up truck can be pulled from beneath the container.

Even without a lifting mechanism between the front end of the freight container and the truck chassis 143, it is possible to pull the chassis out from beneath the container while it is supported on the railway car supports, because the camming action on the front and rear supports provides the required lift of the container 60 with reference to the chassis to permit separation to take place.

After the truck chassis 143 has been removed from the car, the fifth wheel stand may be elevated to support the front end of the container 60, as previously described.

End loading of multiple containers from semi-trailers or pick-up trucks follows the same procedure except that both the intermediate supports L and rear supports F are in operative position as the trailer is backed into place. Brackets, such as shown at 72, are provided at the rear corners of the multiple containers, and the containers ride onto the intermediate supports enroute to their final position in the car, as shown in FIG. 47.

*Lift Truck Side Loading*

Some railroads, because of their established practices and facilities, may prefer to employ lift truck side loading of the containers rather than end loading, and my system adapts itself to this type of loading.

In the first place, a railway car equipped with front and rear supports G and F, or even with intermediate supports L, may be used with conventional containers that may be transferred to the railway car from a highway vehicle by lift trucks, such as indicated at 144 (see FIGURES 24–27), with the containers being placed on the floor of the car with the front and rear supports in their inoperative positions. In other words, equipping a railway car with the devices which I employ for end loading of semi-trailer and pick-up truck loads will not interfere in any way with presently used container system.

In addition, the freight containers which we employ may be provided with slots 145 to receive the fork 146 of the lift truck, and these specially adapted freight containers 147 and 148 (FIG. 26) may then be lifted onto the front, intermediate, and rear supports, and carried in transit on these supports in the manner previously described.

With this type of loading, the freight containers 147 and 148, instead of being provided with outwardly facing brackets 72, may be provided at their rear ends with brackets generally designated 149, as shown in FIG. 48. These brackets have webs 150 which correspond in function to the vertical webs of the brackets 72, but, instead of having outwardly turned horizontal flanges, they may be provided with an inwardly turned flange 151 adapted to support a retractable pin 152, which can be moved to an operative position beneath the associated supports (i.e. either the rear support or the intermediate support) after the containers have been mounted on the car, as shown in FIG. 26.

The adjacent ends of the containers 147 and 148 are then secured together by a plate 126, or similar connecting member, whereupon the fifth wheel stand D is raised to engage the king pin provided on the front container 147, so that the cushioning mechanism in the stand D provides the required cushioning against buff and draft forces while the adjacent ends of the containers 147 and 148 ride on the intermediate supports L, and the rear of the container 148 rides on the rear supports F. Of course, the cushioning mechanism may be provided in the rear supports, in which case the fifth wheel stand, some part thereof, of the kingpin itself, would be mounted in slots for full fore and aft movement.

It should be understood that brackets of the type indicated at 149 in FIG. 48 may be used in place of the brackets 72, even for end loading of freight containers onto a railway car.

*Crane Loading*

Inasmuch as some railroads are equipped for crane loading of containers from the sides of the car, this method of operation is indicated in FIGS. 28–31, inclusive.

For such loading, the freight containers 153 must be built so that they will not collapse when lifted by a crane, such as indicated at 154; and the freight container 153 is provided with lift hooks 155 at its four corners. The freight container is lifted onto the front and rear supports G and F, respectively, and thereafter the fifth wheel stand D is raised to provide the desired fore and aft cushioning movement. The rear end of the freight container 153 is provided with a bracket of the type 149 shown in FIG. 48, or an equivalent type which permits a horizontal member, such as the pin 152, to engage the under side of the rear supports F and thereby lock the container against vertical movement.

It may be pointed out that with slight modification the container 153 and the associated chassis I may be advantageously used in conjunction with ship freight. To the extent that containers are used in ship freight, there is always a crane available at the ship dock, and this crane may be used to raise and lower the container to and from the special chassis I on a railway car equipped with the supports of this invention.

The only modification necessary for this compatability with ship freight is that the lower horizontal flange 89 of the end sill 88 be hinged as shown at 170 (see FIGURE 49) so that it can be latched in either vertical or horizontal positions by the pin 171 cooperating with apertures 172 and 173 in a side flange, and the pin 63 (FIG. 13) is made retractable in the manner shown in FIG. 48. In this way, the container may be dropped vertically onto the chassis I, and then latched to it.

Clearances and Center of Gravity Problems

One of the problems with piggy-back operation has to do with overhead clearances, because in many sections of the country trains must pass under low overhead structures and traverse tunnels of limited clearance.

Most piggy-back semi-trailers have an overall height of 12'6", and it is contemplated that the trucks and semi-trailers made in accordance with this invention would have a similar overall height. Their lengths may be 35 or 40 feet to give the freight containers up to 2000 cubic feet capacity and about 60,000 pounds maximum load.

Although appearance-wise it might seem that a freight container mounted for transit on a railway car on front and rear supports of the type which have been described would have a high center of gravity, actually it is only about one inch higher than the center of gravity of a standard trailer riding piggy-back on a railway car. This slightly higher center of gravity is more than compensated for in so far as stability and clearances are concerned by the more positive anchorage used in securing the freight container directly on the railway car. It has already been pointed out that by mounting the freight container of my invention on rigid rear supports as compared to the standard piggy-back trailer with its sprung load, there is far less tendency for the container to sway and get over clearance lines, to say nothing of the positive securement against vertical bounce relative to the railway car underframe.

In other words, freight containers carried on a railway car in the manner proposed by my system are not only more stable on the car and have substantially equivalent clearances to standard piggy-back operation, but, in addition, the elimination of bounce and sway will necessarily result in better protection of lading and the container itself.

It will be noted that in my system the freight container is carried on the railway car at a height above the floor of the car which is substantially equivalent to the container height above ground when mounted on a truck or semi-trailer chassis. Of course, when specially designed flat cars are used, the floor level may be lowered several inches in order to provide even greater clearances.

Modifications

There are, of course, many modifications of which the present invention is susceptible; and, while it is directed primarily to the problem of freight transportation, it is obvious that the same principles could be applied to passenger transportation wherein the body of a passenger bus, or similar passenger container mounted on a semi-trailer, could be transferred to a railway car for railway transit.

The fifth wheel stand is used in my system because for piggy-back operation it is already on certain existing flat cars, and where a railroad wants to use a single car for piggy-back operation and have it compatible with my system a fifth wheel stand of some type is normally required. However, when compatibility is not essential, the fifth wheel stand can be eliminated with a consequent saving of cost, and the front of the freight container may then be permanently mounted on the front supports with cushioning mechanism being provided either in the front or the rear supports.

Although the use of front, rear, and intermediate supports mounted on the car structure has been emphasized in this disclosure, it should be recognized that in some instances the retractable supports may be provided on the freight container itself, as indicated in FIG. 20. These may take the form of jacks 160 pivoted at 161 so that they may be swung to an inoperative position, preferably length-wise of the freight container. Such jacks, of course, would be provided at all four corners of the freight container.

With such an arrangement, the procedure would be to back the truck or semi-trailer onto the car; lower the jacks 160 into engagement with the floor of the car; and then, if the truck tractor were provided with a vertically shiftable fifth wheel and the semi-trailer with an air spring, as would be preferable, the two mechanisms would be operated to lower the truck chassis with reference to the freight container; and, with the latching mechanism between the freight container and chassis being released, the chassis could be pulled out from beneath the freight container, leaving the freight container resting on the railway car by means of the four jacks 160. With such an arrangement, suitable lashing would be required to maintain the freight container in stable position on the car, and the chain lashings, of course, could be provided with interposed springs for the required cushioning.

Summary

From the above disclosure, it will be seen that my system inherently possesses features of compatibility, versatility, simplicity, low cost, protection of equipment and lading, adequate clearances and stability, economies of operation, and many other advantages which make it attractive for adoption for coordinated highway and railway freight traffic; and it is intended that the appended claims shall include such modifications as will be apparent to those skilled in the art.

It will also be noted that all power requirements for operation of this system may be derived from the truck tractor, such, for example, as the hydraulic system for raising and lowering the fifth wheel assembly, and also the compressor equipment for use in connection with the air springs.

As heretofore observed, the air springs J constitute a convenient means for lowering the rear end of the truck chassis from the container body for separation of the two, but, in addition, the air springs have the inherent characteristic of maintaining the container body a constant distance above the ground regardless of loading of the container. Obviously, this facilitates cooperation with the rear supports when the freight container is backed onto the car. When trucks or semi-trailers having leaf, coil, or torsion springs are used, there may be as much as 1½" to 2" deflection of the springs under the full load; but, as heretofore pointed out, the camming surfaces on the rear supports and on the front supports can lift the freight containers to their desired levels for railway car loading.

In all the foregoing descriptions of loading procedures, it will, of course, be understood that the procedures are reversed for unloading.

In the appended claims, the terms "separated," "separable," or words of like import, as used in conjunction with the freight container and the chassis, are not intended to require a physical separation, but rather are used in a broad sense to include relief of loading between the container and chassis.

The horizontally rotatable and flip-up types of support shown in FIGS. 17 and 18, respectively, have the advantage that when used as front supports, the truck load may be moved rearwardly to its ultimate position for receiving the fifth wheel stand D, after which the front supports may be moved to operative position without requiring subsequent forward movement of the truck load. This is particularly true when a semi-trailer is used with a truck tractor having a vertically adjustable fifth wheel mechanism K.

I claim:

1. Apparatus for transporting freight comprising a container adapted to receive freight, a highway vehicle chassis, means for separably connecting said container to said chassis for highway transit, a railroad car, forward and rearward retractable supports positioned along either side of the car, said retractable supports each comprising a shelf member and means for securing each shelf member to the car for movement between a substantially horizontally disposed, extended container supporting position at an elevation above the floor of the car that is substantially equivalent to the distance that the container is above the ground when transported by said chassis, and a retracted position in which said shelf members are respectively disposed out of the path of movement of said chassis and container longitudinally of the car, said securing means including means for supporting the respective shelf members in their extended positions, said shelf members each comprising a rigid member terminating in forward and rearward ends and formed to define a side edge that extends generally longitudinally of the car and projects into the path of movement of the container and chassis longitudinally of the car when the shelf members are disposed in their respective extended positions, with said forward ends of said rearward retractable support shelf members each being formed with a ramp surface that inclines upwardly rearwardly of the car, guide members carried by said container on each side thereof cooperable with said rear shelf member's side edges for indexing the rear end of the container laterally of and between said rear shelf members, whereby, after said rear shelf members have been disposed in their said extended positions, the chassis when carrying the container may be backed onto the car to cam the container rear end up on the rear shelf members, means for resting the forward end of the container on the forward shelf members while the container remains connected to the chassis and after the forward shelf members have been moved to their said extended positions whereby the chassis may then be withdrawn from under the container after being disconnected therefrom, and means for releasably securing the container to the car.

2. The apparatus set forth in claim 1 wherein said rear shelf members are formed with stop means for limiting movement of the container rearwardly of the said rear shelf members when the container rides thereon, and wherein said forward shelf members are formed with stop means for limiting movement of the container forwardly of said forward shelf members when the container rests thereon.

3. The apparatus set forth in claim 1 wherein said means for releasably securing the container to the car comprises a kingpin carried by the container, a retractable fifth wheel stand secured to the car, and means for releasably securing said stand to said kingpin.

4. The apparatus set forth in claim 3 including cushioning means interposed between said kingpin and the car for cushioning the container against longitudinal impacts applied to the car.

5. The apparatus set forth in claim 1 wherein said means for releasably securing the container to the car comprises pin means carried by the container and groove means formed in the respective forward shelf members for receiving the respective pin means, and means for latching said pin means against movement longitudinally of the car.

6. The apparatus set forth in claim 5 including cushioning means interposed between said pin means and the car for cushioning the container against longitudinal impacts.

7. The apparatus set forth in claim 3 wherein said chassis comprises a wheeled chassis frame including air spring means interposed between the frame and the chassis wheels for raising and lowering said chassis frame with respect to the wheels thereof, whereby said chassis frame may be lowered with respect to the container after the container is applied to said shelf members to facilitate withdrawal of the chassis from under the container.

8. In a railroad car adapted for use in a system of handling freight containers wherein the freight container may be separably connected to a highway vehicle chassis for transfer to the railroad car for rail transit, which system is compatible with the piggyback system of mounting semi-trailer highway vehicles on a flatcar, which car includes a wheeled frame defining an open deck extending along the length thereof and having a width adapting same to serve as a roadway for movement of the highway vehicle lengthwise of the car, the improvement wherein retractable supports are secured to either side of the car adjacent the ends of the car, said supports each comprising a shelf member having a planar load supporting surface and means for securing each shelf member to the car for movement between an extended container supporting position in which said supporting surfaces are substantially horizontally disposed within the roadway at an elevation above the floor of the car that is substantially equivalent to the distance that the container is above the ground when transported by said chassis, and a retracted position in which said shelf members are respectively disposed out of the roadway, said securing means including means for supporting the respective shelf members in their extended positions, said shelf members each comprising a rigid member terminating in forward and rearward ends and formed to define a side edge that extends generally longitudinally of the car and projects into the roadway when the shelf members are disposed in their respective extended positions, with said forward ends of said rearward shelf members each being formed with a ramp surface that inclines upwardly rearwardly of the car, whereby, said shelf members when in their said retracted positions permit movement of semi-trailer vehicles and said chassis when carrying said container across the length of the car, and whereby, after said shelf members having been disposed in their said extended positions, the container may be rested on said surfaces whereby the chassis may be withdrawn from under the container after being disconnected therefrom.

References Cited in the file of this patent
UNITED STATES PATENTS

| | | |
|---|---|---|
| 1,675,512 | Otis | July 3, 1928 |
| 1,931,746 | Allsworth et al. | Oct. 24, 1933 |
| 2,033,119 | Bennett | Mar. 10, 1936 |
| 2,099,288 | Allen | Nov. 16, 1937 |
| 2,114,707 | Fitch et al. | Apr. 19, 1938 |
| 2,150,371 | Furnish | Mar. 14, 1939 |
| 2,166,948 | Fitch | July 25, 1939 |
| 2,170,581 | West et al. | Aug. 22, 1939 |
| 2,204,667 | Dooley et al. | June 18, 1940 |
| 2,223,275 | Valenzuela | Nov. 26, 1940 |
| 2,285,207 | Johnson | June 2, 1942 |
| 2,304,418 | McMurry | Dec. 8, 1942 |
| 2,715,971 | Cox | Aug. 23, 1955 |
| 2,720,324 | Cosentino | Oct. 11, 1955 |
| 2,736,602 | Ault | Feb. 28, 1956 |
| 2,767,661 | Tennant | Oct. 23, 1956 |
| 2,767,999 | Gouirand | Oct. 23, 1956 |
| 2,812,974 | McHugh | Nov. 12, 1957 |
| 2,817,303 | Charlet | Dec. 24, 1957 |
| 2,818,033 | Gutridge et al. | Dec. 31, 1957 |
| 2,872,880 | Madden | Feb. 10, 1959 |